(12) United States Patent
Ikeda

(10) Patent No.: US 7,219,411 B2
(45) Date of Patent: May 22, 2007

(54) METHOD FOR MANUFACTURING COMMUTATOR HAVING COMMUTATOR SEGMENTS

(75) Inventor: Shinji Ikeda, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 441 days.

(21) Appl. No.: 10/801,813

(22) Filed: Mar. 17, 2004

(65) Prior Publication Data

US 2004/0181930 A1 Sep. 23, 2004

(30) Foreign Application Priority Data

Mar. 20, 2003 (JP) ............................. 2003-077962

(51) Int. Cl.
 *H02K 1/00* (2006.01)
(52) U.S. Cl. ............................. 29/597; 29/596; 29/733; 82/1.11; 82/118
(58) Field of Classification Search .......... 29/596–598, 29/732–735; 310/233, 235, 237, 89; 82/1.11, 82/18
See application file for complete search history.

(56) References Cited

U.S. PATENT DOCUMENTS 5,003,212 A * 3/1991 Ibe et al. ..................... 310/235
5,065,651 A * 11/1991 Amey ........................... 82/1.11
5,174,001 A * 12/1992 Shirai et al. ................. 29/27 B

FOREIGN PATENT DOCUMENTS

| JP | 63-265547 | * 11/1988 |
| JP | 4-30901 | * 2/1992 |
| JP | A-7-163092 | 6/1995 |
| JP | 2004-289921 | * 10/2004 |

* cited by examiner

*Primary Examiner*—Minh Trinh
(74) *Attorney, Agent, or Firm*—Posz Law Group, PLC

(57) ABSTRACT

A feed rate of a single-point cutting tool, which is an axial relative moving distance of the cutting tool along an outer peripheral surface of an unfinished commutator product per revolution of the unfinished commutator product, is reduced in an end part of a cutting region of the outer peripheral surface of the unfinished commutator product, which is adjacent to a commutator riser of each commutator segment provided in the outer peripheral surface of the unfinished commutator product.

7 Claims, 3 Drawing Sheets

METHOD FOR MANUFACTURING COMMUTATOR HAVING COMMUTATOR SEGMENTS

CROSS REFERENCE TO RELATED APPLICATION

This application is based on and incorporates herein by reference Japanese Patent Application No. 2003-77962 filed on Mar. 20, 2003.

BACKGROUND OF THE INVENTION

1. Field of the Invention

The present invention relates to a method for manufacturing a commutator, and more specifically to a cutting process for finishing an outer peripheral surface of the commutator.

2. Description of Related Art

In general, a commutator of a motor includes a generally cylindrical dielectric body made of resin and a plurality of commutator segments. The commutator segments are arranged at generally equal intervals along an outer peripheral surface of the dielectric body. In manufacturing of the commutator, a planar commutator segment material, which is cut out from a corresponding plate and has a predetermined shape, is rolled. Thus, the cylindrical commutator segment material, which has a plurality of commutator risers at one axial end, is formed. Next, a dielectric material is filled in a space defined radially inward of the cylindrical commutator segment material. Upon curing of the dielectric material, a plurality of slit grooves, which are arranged at predetermined angular intervals, is formed in the cylindrical commutator segment material using, for example, a cutter. The slit grooves divide the cylindrical commutator segment material into the commutator segments. Thereafter, a surface finishing operation of outer surfaces of the commutator segments is performed to remove burrs of the commutator segments formed around the slit grooves and/or to increase a degree of circularity of the outer surfaces of the commutator segments. At this time, a single-point cutting tool is used to cut the outer surfaces of the commutator segments in the surface finishing operation.

At the time of surface finishing operation of the commutator segments, depending on the material of the commutator segments, degradation of the single-point cutting tool (cutting edge), a moving speed of the single-point cutting tool and/or the like, a burr is likely formed in the vicinity of a cutting operation end point of a cutting region of each commutator segment, which is cut by the single-point cutting tool. When the burr is held in one of the slits, which divide the corresponding adjacent commutator segments, layer short circuiting could occur at the time of driving the motor. Such short circuiting causes a reduction in a product yield of the motor. To address such a disadvantage, for example, Japanese Unexamined Patent Publication No. 7-163092 discloses a technique, which combines a rough cutting process and a finishing cutting process.

However, in the technique disclosed in Japanese Unexamined Patent Publication No. 7-163092, burrs, which are generated in an unfinished commutator product in the rough cutting process, need to be removed after the rough cutting process. Thus, the finishing cutting process is required to remove the burrs. More specifically, at the time of performing the surface finishing of an outer peripheral surface of the unfinished commutator product, a cutting process needs to be repeated two or more times using a single-point cutting tool. Thus, the number of cutting processes is disadvantageously increased, and thereby the manufacturing costs of the commutator are disadvantageously increased.

SUMMARY OF THE INVENTION

The present invention addresses the above disadvantages. Thus, it is an objective of the present invention to provide a manufacturing method of a commutator, which can achieve a reliable cutting process of the commutator and can minimize manufacturing costs of the commutator.

To achieve the objective of the present invention, there is provided a method for manufacturing a commutator. In the method, an unfinished commutator product is rotated about a central axis of the unfinished commutator product. The unfinished commutator product includes a plurality of commutator segments, each of which axially extends along an outer peripheral surface of the unfinished commutator product between a first axial end and a second axial end of the unfinished commutator product and includes a coil connection at a location adjacent the second axial end of the unfinished commutator product. Furthermore, at least one of a cutting means and the unfinished commutator product is axially moved to create relative movement of the cutting means along a cutting region of the outer peripheral surface of the unfinished commutator product from the first axial end of the unfinished commutator product toward the second axial end of the unfinished commutator product while the unfinished commutator product is rotated, so that an outer surface of each commutator segment is cut from a cutting operation start point to a cutting operation end point of the commutator segment. The cutting operation start point of each commutator segment is located in the first end of the unfinished commutator product. The cutting operation end point of each commutator segment is located adjacent the coil connection of the commutator segment between the cutting operation start point and the coil connection. A feed rate of the cutting means, which is an axial relative moving distance of the cutting means along the outer peripheral surface of the unfinished commutator product per revolution of the unfinished commutator product, is reduced in an end part of the cutting region, which includes the cutting operation end point and a section of the cutting region adjacent the cutting operation end point, in comparison to that of the rest of the cutting region.

In the above method, a rotational speed of the unfinished commutator product may be increased in the end part of the cutting region in comparison to that of the rest of the cutting region. In such a case, a feed rate of the cutting means may be kept constant throughout the cutting region although the feed rate is reduced in the end part of the cutting region in comparison to that of the rest of the cutting region in the above method.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

A first embodiment of the present invention will be described with reference to the accompanying drawings.

Figure 1:
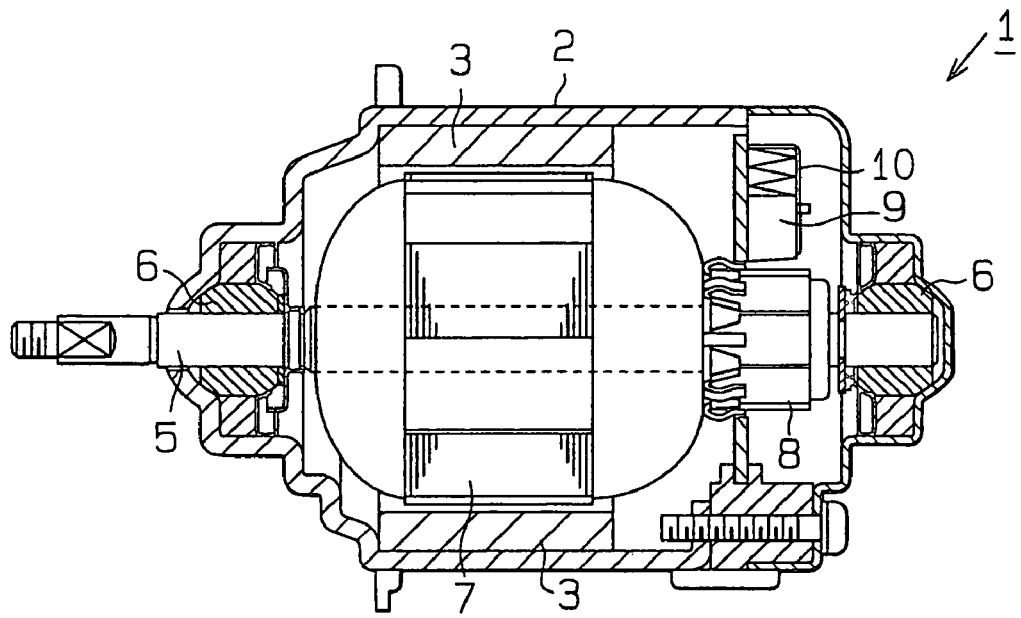
FIG. 1 is a schematic cross sectional view of a motor according to a first embodiment of the present invention.

As shown in FIG. 1, in a direct current motor 1, which serves as a dynamo-electric machine, a plurality of magnets 3 is secured to an inner peripheral surface of a housing 2. Two opposed ends of a rotatable shaft 5, which is disposed radially inward of the magnets 3 in the housing 2, are rotatably supported by bearings 6. A core 7, which has coils, is secured to an axial intermediate portion of the rotatable shaft 5. A commutator 8 is secured around one (right one in FIG. 1) of the opposed ends of the rotatable shaft 5.

Figure 2:
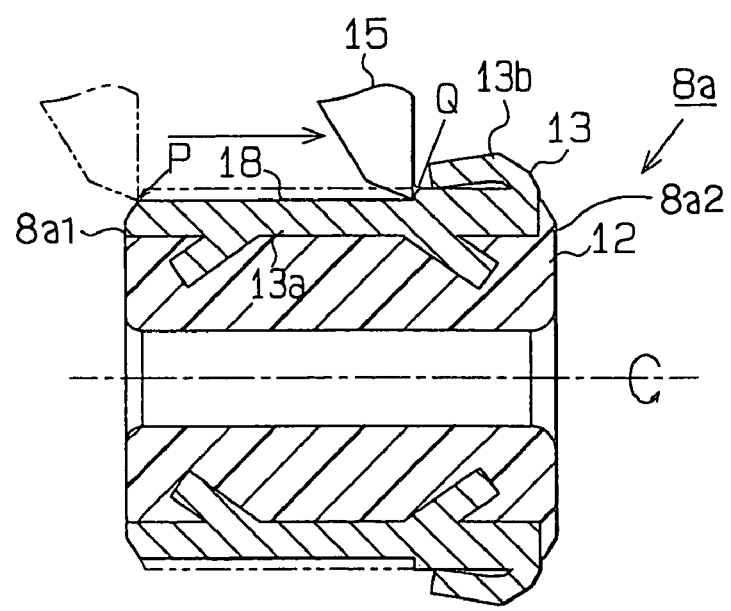
FIG. 2 is a cross sectional view of an unfinished commutator product according to the first embodiment, to which a surface finishing cutting operation is performed.

As shown in FIG. 2, an unfinished commutator product 8a, which undergoes an finishing cutting operation and is thus finished into the commutator 8 of FIG. 1, includes a generally cylindrical dielectric body 12 made of resin and a plurality of commutator segments 13. The commutator segments 13 are arranged along an outer peripheral surface of the dielectric body 12. Each commutator segment 13 includes a segment main body 13a and a commutator riser 13b. An outer surface of the segment main body 13a is formed into an arcuate shape, which corresponds to the outer peripheral surface of the dielectric body 12. The commutator riser 13b is formed in one end of the segment main body 13a and serves as a coil connection, to which a corresponding coil is connected. The segment main body 13a is formed into a generally rectangular plate, which has a predetermined width. Upon the finishing of the unfinished commutator product 8a into the finished commutator 8 and installation of the finished commutator 8 into the direct current motor 1, each power supply brush 9 is urged against the outer surfaces of the segment main bodies 13a by a corresponding coil spring 10, so that electric current for driving the direct current motor 1 is supplied to the commutator segments 13 through the power supply brushes 9.

Figure 3:
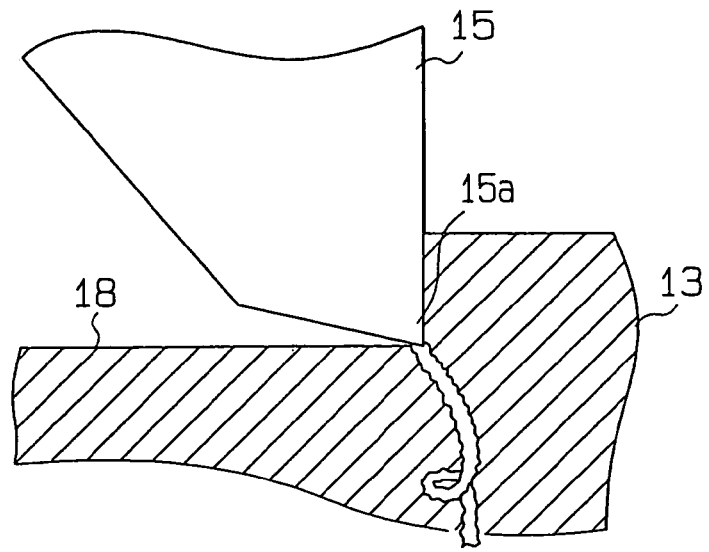
FIG. 3 is a partially enlarged view of the unfinished commutator product in the middle of the surface finishing cutting operation of the first embodiment.

As shown in FIGS. 2 and 3, at the time of surface finishing cutting operation of the unfinished commutator product 8a, a cut portion or cutting region (an axial extent of which corresponds to an axial extent of a cutting region of the outer peripheral surface of the unfinished commutator product 8a) 18 is formed in the outer surface of each commutator segment 13. In the cutting region 18, a portion of the commutator segment 13 is cut and is thus removed by a single-point cutting tool 15, which serves as a cutting means. More specifically, the unfinished commutator product 8a is rotated about a central axis of the unfinished commutator product 8a at a predetermined rotational speed. Then, a distal end 15a of the single-point cutting tool 15 is relatively moved along the outer peripheral surface of the unfinished commutator product 8a from a first axial end 8a2 of the unfinished commutator product 8a toward a second axial end 8a2 of the unfinished commutator product 8a while the unfinished commutator product 8a is rotated, so that the outer surface of each commutator segment 13 is cut from a cutting operation start point P to a cutting operation end point Q of the commutator segment 13. More specifically, the distal end 15a of the single-point cutting tool 15 is engaged with the surfaces of the commutator segments 13 and is moved from the cutting operation start point P, which is located on one end of each commutator segment 13 opposite from the commutator riser 13b, to the cutting operation end point Q, which is located adjacent to the commutator riser 13b, to perform the surface finishing cutting operation of the commutator 8.

Figure 4A:
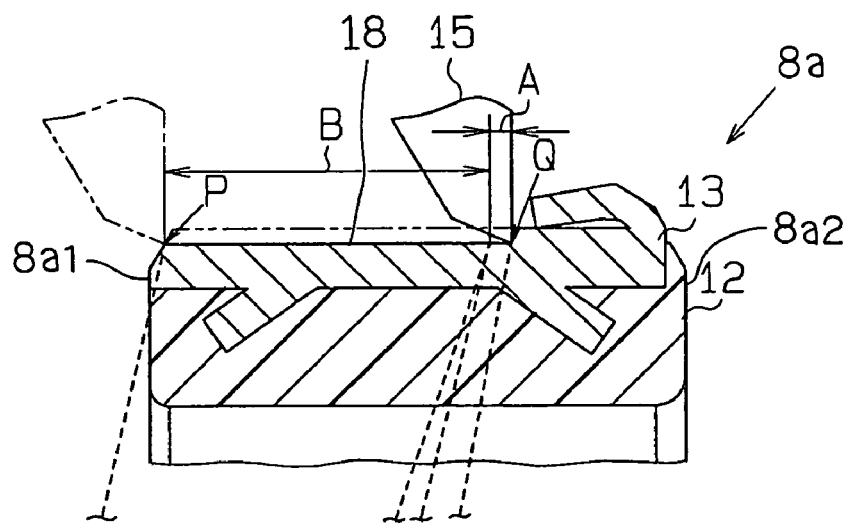
FIG. 4A is a schematic view showing a relationship between a first cutting part and a second cutting part according to the first embodiment.

As shown in FIG. 4A, at the time of moving the single-point cutting tool 15 from the cutting operation start point P to the cutting operation end point Q, an axial moving distance of the single-point cutting tool 15 per revolution of the unfinished commutator product 8a differs between a first cutting part A of the cutting region 18, which is a cutting part located adjacent the cutting operation end point Q and thus serves as an end part of the cutting region 18, and a second cutting part B of the cutting region 18, which is a cutting part other than the cutting part adjacent the cutting operation end point Q, i.e., which is the rest of the cutting region 18. Here, the first cutting part A is set to be substantially shorter than the second cutting part B. More specifically, a size (axial length) of the first cutting part A is set to be equal to or less than 2% of the entire size (entire axial length) of the cutting region 18. This ratio can be changed to any desired value based on a size of the commutator segment 13, a rigidity of the material of the commutator segment 13 and/or the like and is desirably set within a range of 0.1 to 10%.

Figure 4B:
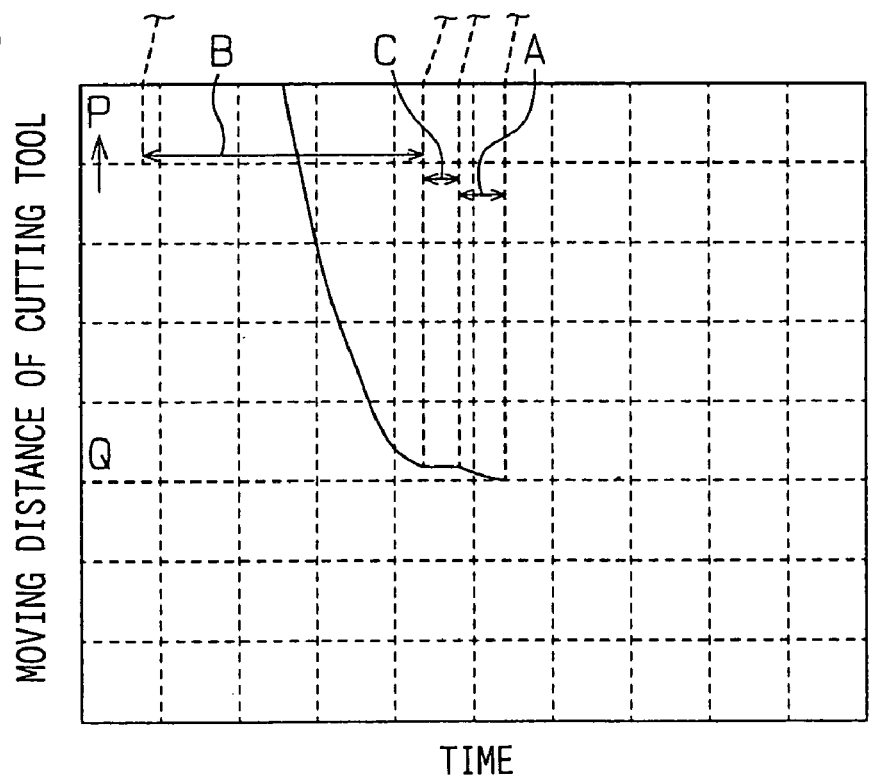
FIG. 4B is a graph showing a relationship between a moving time of a single-point cutting tool and a moving distance of the single-point cutting tool according to the first embodiment.

FIG. 4B shows a relationship between a moving time of the single-point cutting tool 15 and a moving distance of the single-point cutting tool 15 around the cutting operation end point Q, that is, FIG. 4B shows a moving speed of the single-point cutting tool 15. An axis of abscissas of the graph of FIG. 4B indicates the moving time of the single-point cutting tool 15, and an axis of ordinates indicates a moving distance of the single-point cutting tool 15. In the present embodiment, the finishing cutting operation of the commutator segments 13 is performed on both of the second cutting part B and the first cutting part A in a single cutting process. The moving speed of the single-pint cutting tool 15 in the first cutting part A is set to be slower than the moving speed of the single-point cutting tool 15 in the second cutting part B. Here, it is desirable that the moving speed of the single-point cutting tool 15 in the first cutting part A is within a range of 0.01 to 1% of the moving speed of the single-point cutting tool 15 in the second cutting part B. When the single-point cutting tool 15 is moved from the second cutting part B to the first cutting part A, movement of the single-point cutting tool 15 is temporarily stopped in a boundary between the second cutting part B and the first cutting part A, as indicated in a range C in FIG. 4B.

Figure 5:
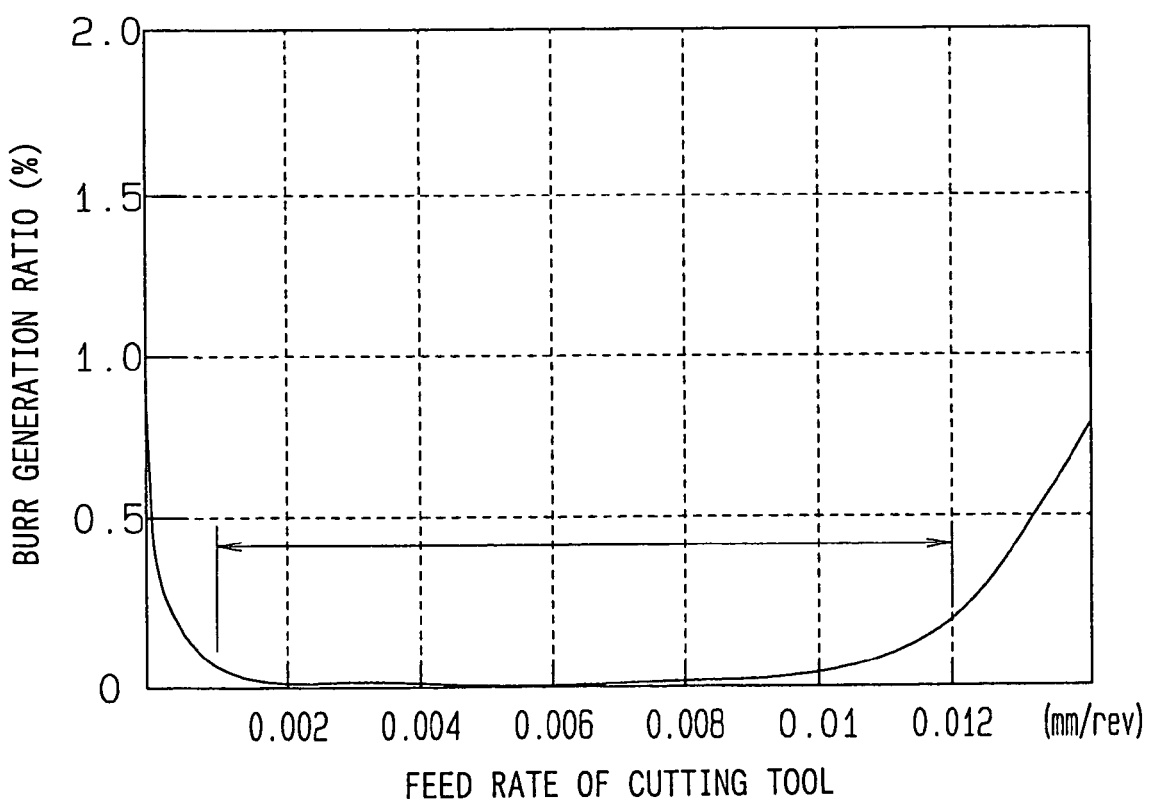
FIG. 5 is a graph showing a relationship between a feed rate and a burr generation ratio.

FIG. 5 shows a relationship between a feed rate, i.e., a feed per revolution (mm/revolution) of the single-point cutting tool 15 and a generation ratio (hereinafter referred to as a burr generation ratio) of a burr formed in the vicinity of the cutting operation end point Q at the time of cutting. The data of FIG. 5 is obtained when the unfinished commutator product 8a is rotated about 15,000 rpm. In FIG. 5, the feed rate (mm/revolution) of the single-point cutting tool 15 refers to an axial moving distance of the single-point cutting tool 15 per revolution of the unfinished commutator product 8a in a direction parallel to the central axis of the unfinished commutator product 8a in the first cutting part A. The burr generation ratio (%) refers to a ratio of the number of the burred commutators 8 relative to the total number of finished commutators 8, on each of which the finishing cutting operation has been performed. Here, the burred commutator 8 is defined as a commutator that has at least one distinctive burr, which has a size equal to or greater than a predetermined size that causes short circuiting between two of the commutator segments 13 when the burr is held in a corresponding slit defined between the two of the commutator segments 13.

With reference to FIG. 5, the burr generation ratio (%) is relatively high in two regions, i.e., in a region where the feed rate of the single-point cutting tool 15 is less than 0.001 mm/revolution and in a region where the feed rate of the single-pint cutting tool 15 is greater than 0.012 mm/revolution. By contrast, when the feed rate of the single-point cutting tool 15 is set to be in a range of 0.001 to 0.012 mm/revolution, the burr is less likely formed in the vicinity of the cutting operation end point Q, so that the burr generation ratio can be advantageously limited to a value equal to or less than about 0.3%. The burr generation ratio is reduced in the above feed rate range (i.e., the range of 0.001 to 0.012 mm/revolution) of the single-point cutting tool 15 due to a fact that a cutting resistance is reduced in the vicinity of the cutting operation end point Q, and influences of elastic deformation of the commutator segments 13 are made relatively small. It is further desirable to set the feed rate of the single-point cutting tool 15 in a range of 0.004 to 0.008 mm/revolution. This is due to the fact that when the feed rate of the single-point cutting tool 15 is set within this range (0.004 to 0.008 mm/revolution), the burr generation ratio is advantageously reduced to a value equal to or less than 0.1%. It is more desirable to set the feed rate of the single-point cutting tool 15 in a range of 0.005 to 0.007 mm/revolution. This is due to the fact that when the feed rate of the single-point cutting tool 15 is set within this range (0.005 to 0.007 mm/revolution), the burr generation ratio is advantageously and substantially reduced to zero.

Advantages of the First Embodiment will be Described.

(1) The surface finishing cutting operation of the commutator segments 13 can be performed on both of the second cutting part B and the first cutting part A in the single cutting process. Thus, in comparison to the previously proposed method, the number of the cutting processes can be reduced. As a result, the manufacturing costs of the commutator 8 can be reduced.

(2) The first cutting part A is only a small portion of the entire cutting region 18. Thus, even when the feed rate of the single-point cutting tool 15 is made relatively small in the first cutting part A, a loss in time required to perform the cutting process can be minimized. As a result, a cycle time can be minimized, and thereby a manufacturing efficiency of the commutator 8 can be improved.

(3) When the single-point cutting tool 15 is moved from the second cutting part B to the first cutting part A, the movement of the single-point cutting tool 15 in the boundary between the second cutting part B and the first cutting part A is temporarily stopped. In this case, the cutting resistance in the vicinity of the cutting operation end point Q is made relatively small, so that the burr is less likely produced. Thus, at the time of the surface finishing cutting operation of the commutator segments 13, the burr generation ratio is reduced, and thereby a product yield can be improved. As a result, the more reliable cutting process can be performed.

(Second Embodiment)

A second embodiment of the present invention will be described. A manufacturing method of the commutator 8 according to a second embodiment is similar to that of the first embodiment except movement of the single-point cutting tool 15. Thus, components and settings similar to those of the first embodiment will not be described further.

In the second embodiment, the finishing cutting operation of the commutator segments 13 is performed on both of the second cutting part B and the first cutting part A in a single cutting process. When the single-point cutting tool 15 is moved from the second cutting part B to the first cutting part A, the axial movement of the single-point cutting tool 15 is temporarily retarded in the boundary between the second cutting part B and the first cutting part A in comparison to the axial movement of the single-point cutting tool 15 in the second cutting part B.

Thus, the second embodiment provides the following advantages.

(4) When the single-point cutting tool 15 is moved from the second cutting part B to the first cutting part A, the movement of the single-cutting tool 15 is not temporarily stopped. Thus, the loss in the time required to perform the cutting process is further minimized. As a result, the cycle time is further minimized, so that the manufacturing efficiency of the commutator 8 can be further improved.

The first and second embodiments can be modified as follows.

According to the first and second embodiments, in the boundary between the second cutting part B and the first cutting part A, the axial movement of the single-point cutting tool 15 is temporarily stopped or is temporarily retarded relative to the axial movement of the single-point cutting tool 15 in the second cutting part B. However, the moving speed of the single-point cutting tool 15 can be gradually reduced in the boundary between the second cutting part B and the first cutting part A.

In the first and second embodiments, the single-point cutting tool 15 is used in the surface finishing cutting operation of the commutator segments 13. However, the single-point cutting tool 15 can be replaced with any other appropriate tool.

In the first and second embodiments, a rotational speed of the unfinished commutator product 8a is kept constant (about 15,000 rpm). However, a rotational speed of the unfinished commutator product can be increased in the first cutting portion A in comparison to that of the second cutting portion B while maintaining a constant feed rate of the single-point cutting tool 15 throughout the cutting region 18. For example, the rotational speed of the unfinished commutator product can be set to about 15,000 rpm in the second cutting portion B, and the rotational speed of the unfinished commutator product can be increased to about 20,000 rpm in the first cutting portion A. It should be noted that these rotational speeds may be varied based on, for example, a diameter of the unfinished commutator product. Also, in addition to the increase in the rotational speed of the unfinished commutator product in the first cutting portion A, the feed rate of the cutting means can be reduced in the first cutting portion A in comparison to that of the second cutting portion B. Even with the above modifications, generation of the burrs can be effectively reduced.

In the above embodiment, the single-point cutting tool 15 is axially moved relative to the unfinished commutator product 8a, which is held in a predetermined axial position. Alternatively, the unfinished commutator product 8a can be axially moved relative to the single-point cutting tool 15, which is held in a predetermined axial position. In such a case, the unfinished commutator product 8a can be axially moved at a feed rate, which is the same as the above-described feed rate of the single-point cutting tool 15.

Additional advantages and modifications will readily occur to those skilled in the art. The invention in its broader terms is therefore not limited to the specific details, representative apparatus, and illustrative examples shown and described.

What is claimed is:

1. A method for manufacturing a commutator, the method comprising:

rotating an unfinished commutator product about a central axis of the unfinished commutator product, wherein the unfinished commutator product includes a plurality of commutator segments, each of which axially extends along an outer peripheral surface of the unfinished commutator product between a first axial end and a second axial end of the unfinished commutator product and includes a coil connection at a location adjacent the second axial end of the unfinished commutator product; and axially moving at least one of a cutting tool and the unfinished commutator product to create relative movement of the cutting tool along a cutting region of the outer peripheral surface of the unfinished commutator product from the first axial end of the unfinished commutator product toward the second axial end of the unfinished commutator product while the unfinished commutator product is rotated, so that an outer surface of each commutator segment is cut from a cutting operation start point to a cutting operation end point of the commutator segment, wherein:

the cutting operation start point of each commutator segment is located in the first end of the unfinished commutator product; the cutting operation end point of each commutator segment is located adjacent the coil connection of the commutator segment between the cutting operation start point and the coil connection; and a feed rate of the cutting tool, which is an axial relative moving distance of the cutting tool along the outer peripheral surface of the unfinished commutator product per revolution of the unfinished commutator product, is reduced in an end part of the cutting region, which includes the cutting operation end point and a section of the cutting region adjacent the cutting operation end point, in comparison to that of the rest of the cutting region; and the feed rate of the cutting tool in the end part of the cutting region is in a range of 0.001–0.012 mm/revolution.

2. The method according to claim 1, wherein the axially moving of the at least one of the cutting tool and the unfinished commutator product includes temporarily stopping the axial movement of the at least one of the cutting tool and the unfinished commutator product when the cutting tool is relatively moved from the rest of the cutting region to the end part of the cutting region, so that the relative movement of the cutting tool is temporarily stopped.

3. The method according to claim 1, wherein the axially moving of the at least one of the cutting tool and the unfinished commutator product includes reducing an axial moving speed of the at least one of the cutting tool and the unfinished commutator product when the cutting tool is relatively moved from the rest of the cutting region to the end part of the cutting region.

4. The method according to claim 1, wherein the rotating of the unfinished commutator product includes increasing a rotational speed of the unfinished commutator product when the cutting tool is relatively moved from the rest of the cutting region to the end part of the cutting region.

5. The method according to claim 1, wherein a rotational speed of the unfinished commutator product is kept constant throughout the cutting region.

6. A method for manufacturing a commutator, the method comprising:

rotating an unfinished commutator product about a central axis of the unfinished commutator product, wherein the unfinished commutator product includes a plurality of commutator segments, each of which axially extends along an outer peripheral surface of the unfinished commutator product between a first axial end and a second axial end of the unfinished commutator product and includes a coil connection at a location adjacent the second axial end of the unfinished commutator product; and axially moving at least one of a cutting tool and the unfinished commutator product to create relative movement of the cutting tool along a cutting region of the outer peripheral surface of the unfinished commutator product from the first axial end of the unfinished commutator product toward the second axial end of the unfinished commutator product while the unfinished commutator product is rotated, so that an outer surface of each commutator segment is cut from a cutting operation start point to a cutting operation end point of the commutator segment, wherein:

the cutting operation start point of each commutator segment is located in the first end of the unfinished commutator product; the cutting operation end point of each commutator segment is located adjacent the coil connection of the commutator segment between the cutting operation start point and the coil connection;

a feed rate of the cutting tool, which is an axial relative moving distance of the cutting tool along the outer peripheral surface of the unfinished commutator product per revolution of the unfinished commutator product, is reduced in an end part of the cutting region, which includes the cutting operation end point and a section of the cutting region adjacent the cutting operation end point, in comparison to that of the rest of the cutting region; and the axial movement of the at least one of the cutting tool and the unfinished commutator product includes temporarily stopping the axial movement of the at least one of the cutting tool and the unfinished commutator product when the cutting tool is relatively moved from the rest of the cutting region to the end part of the cutting region, so that the relative movement of the cutting tool is temporarily stopped.

7. A method for manufacturing a commutator, the method comprising:

rotating an unfinished commutator product about a central axis of the unfinished commutator product, wherein the unfinished commutator product includes a plurality of commutator segments, each of which axially extends along an outer peripheral surface of the unfinished commutator product between a first axial end and a second axial end of the unfinished commutator product and includes a coil connection at a location adjacent the second axial end of the unfinished commutator product; and axially moving at least one of a cutting tool and the unfinished commutator product to create relative movement of the cutting tool along a cutting region of the outer peripheral surface of the unfinished commutator product from the first axial end of the unfinished commutator product toward the second axial end of the unfinished commutator product while the unfinished commutator product is rotated, so that an outer surface of each commutator segment is cut from a cutting operation start point to a cutting operation end point of the commutator segment, wherein:

the cutting operation start point of each commutator segment is located in the first end of the unfinished commutator product; the cutting operation end point of each commutator segment is located adjacent the coil connection of the commutator segment between the cutting operation start point and the coil connection;

a feed rate of the cutting tool, which is an axial relative moving distance of the cutting tool along the outer peripheral surface of the unfinished commutator product per revolution of the unfinished commutator product, is reduced in an end part of the cutting region, which includes the cutting operation end point and a section of the cutting region adjacent the cutting operation end point, in comparison to that of the rest of the cutting region; and the axial movement of the at least one of the cutting tool and the unfinished commutator product includes temporarily stopping the axial movement of the at least one of the cutting tool and the unfinished commutator product before the cutting tool is relatively moved to the end part of the cutting region, so that the relative movement of the cutting tool is temporarily stopped between the end part of the cutting region and the rest of the cutting region.

* * * * *